United States Patent [19]

Belfort et al.

[11] Patent Number: 5,852,127
[45] Date of Patent: Dec. 22, 1998

[54] MODIFICATION OF POROUS AND NON-POROUS MATERIALS USING SELF-ASSEMBLED MONOLAYERS

[75] Inventors: Georges Belfort, Slingerlands; Peter Boehme, Troy, both of N.Y.

[73] Assignee: Rensselner Polytechnic Institute, Troy, N.Y.

[21] Appl. No.: 680,529

[22] Filed: Jul. 9, 1996

[51] Int. Cl.[6] ....................................................... C08F 8/14
[52] U.S. Cl. .................. 525/327.7; 210/500.24; 525/61; 525/330.1
[58] Field of Search ....................... 210/500.24; 428/500; 525/61, 327.7, 330.1

[56] References Cited

U.S. PATENT DOCUMENTS

| | | | |
|---|---|---|---|
| 4,326,532 | 4/1982 | Hammar | 428/411 |
| 4,378,803 | 4/1983 | Takagi | 525/61 |
| 4,540,742 | 9/1985 | Okamoto | 525/61 |
| 4,722,906 | 2/1988 | Guire | 436/501 |
| 4,973,493 | 11/1990 | Guire | 427/2 |
| 5,002,582 | 3/1991 | Guire et al. | 623/66 |
| 5,134,193 | 7/1992 | Scwab | 525/61 |
| 5,135,297 | 8/1992 | Valint | 428/500 |
| 5,135,982 | 8/1992 | Matsumoto | 525/61 |
| 5,280,084 | 1/1994 | Paul | 428/500 |
| 5,292,802 | 3/1994 | Rhee | 525/61 |
| 5,403,922 | 4/1995 | Garelli-Calvet | 536/1.11 |
| 5,455,072 | 10/1995 | Bension et al. | 427/255.7 |
| 5,486,357 | 1/1996 | Narayanan | 525/54.1 |
| 5,576,072 | 11/1996 | Hostettler | 427/532 |
| 5,616,287 | 4/1997 | Finter | 525/61 |
| 5,633,316 | 5/1997 | Gartner | 525/330.1 |

OTHER PUBLICATIONS

"Reactive and Rigid Monolayers . . . ", Peter Bohme, J. Am.Chem.Soc. 1995, 117, 5824–5828.

"FT–IR Spectroscopic . . . ", Peter Bohme, J of Applied Polymer Science, vol. 55, 1495–1505 (1995).

*Primary Examiner*—Paul R. Michl
*Attorney, Agent, or Firm*—Notaro & Michalos, PC

[57] ABSTRACT

A method of modifying the exposed surface of porous and non-porous organic polymer materials provides a multiplicity bifunctional organic molecules that have opposite functional ends. One end of each is bonded to the polymer material to form a self-assembled monolayer on the polymer material with opposite ends of the multiplicity of bifunctional organic molecules forming a new exposed surface for the polymer material. The method includes modifying the new exposed surface by chemically interacting with the opposite ends of the multiplicity of bifunctional organic molecules.

8 Claims, 5 Drawing Sheets

(Nitrene radical)

Broad spectrum of nitrene insertions reactions resulting in immobilization of spezies adsorbed to the surface in the moment of irradiation.

MODIFICATION OF POROUS AND NON-POROUS MATERIALS USING SELF-ASSEMBLED MONOLAYERS

FIELD AND BACKGROUND OF THE INVENTION

The present invention relates in general to self-assembled monolayers or SAM's, and in particular to a new and useful method of creating a fully or partially covalently linked SAM on an organic polymer material as well as a method for modifying the exposed surface of the SAM.

U.S. Pat. No. 5,455,072 discloses: self-assembly, covalent reaction to a solid substrate, and polymeric substrates such as poly vinyl acetate (PVAc) and polyethylene (PE) and their deposition or formation by coating or casting from solution. This patent does not suggest polymer supports (besides PVA and PE) that do not need specific stretching and preparation. In U.S. Pat. No. 5,455,072, each molecule must be bound in the SAM to the surface. The patent does not bind a fraction of the molecule, and allow the rest to interdigitize and be held in place by cooperative intermolecular forces, a crucial difference in the method of the present invention where layers are mostly defect-free. According to the present invention, bifunctional molecules (e.g. bolaamphilphiles) can hydrogen bond, interact through $\pi$—$\pi$ electrons and interact hydrophobically with other aligned bound or non-bound bolaamphphiles. For example, they can also react directly with amine groups on proteins. The SAM's of the invention are symmetrical in the vertical direction. Another important aspect of the invention is the choice of molecules for self-assembly —such as the bolaamphiphiles with two benzoyl azide functional end groups.

Also, see U.S. Pat. Nos. 4,722,906; 4,973,493 and 5,002,582 for other relevant teaching.

In the literature, an article, "Reactive and rigid monolayers of ...", by P. Boehme et al, *J. Am Chem. Soc.* 1995, 117, 5824–5828: discloses preparing monolayers using the Langmuir-Blodgett procedure and not via self-assembly. The layers are then deposited onto polyacrylonitrile (PAN) films (without covalent attachment to the surface) and then the outer exposed surface is reacted with amines in the gas phase. Several differences exist between this article and the present invention. There is no mention of self-assembly. The article does not teach how to effect the self-assembly process onto polymers. A completely different procedure to deposit bolaamphiphiles onto the surface is taught. The article does not react the exposed benzoyl azide functional end-groups in a solvent but in the gas phase.

The article, "Monolayers on disordered substrates: self-assembly of ...", by Ferguson et al. Macromolecules, 1993, 26, 5870: is restricted to amphiphilic trichlorosilane derivatives which are completely different from bolaamphiphiles. They and others have thoroughly investigated the self-assembly of these molecules on inorganic substrates (i.e. glass, mica, silica), but not self-assembly of bifunctional bolaamphiphiles on organic polymeric surfaces and subsequent reaction of the exposed functional benzoyl azide groups. Because of the high reactivity of this class of molecules (trichlorosilane derivatives) it is usually very difficult to control the formation of only one molecular layer with an ordered structure. It is more likely that their surface results in multi-layers and that their surface reaction is not a self-ordering reaction as in the present invention, but rather like an interfacial polymerization reaction. The amphiphilic trichlorosilane derivatives are alkyl derivatives without a second functional head group which distinguishes them further from bolaamphiphiles and from the present invention.

SUMMARY OF THE INVENTION

The invention is a process for creating a fully or partly covalently linked self-assembled monolayer (SAM) of bolaamphiphilic or similar molecules on organic polymer materials with specific functionalities (i.e. amino, hydroxyl and/or thiol groups), where the surface may be porous or non-porous, as well as a method of modifying the exposed surface of the self-assembled monolayer, as well as the SAM itself.

Depositing molecules in self assembled monolayers on polymers is much more complex than on metals or inorganic surfaces because small molecules could easily diffuse into the polymer matrix and disappear from the surface. Hence, knowing how to form self-assembled layers on these surfaces does not suggest how to do it on polymers. What is crucial for the invention is the intermolecular forces between the molecules in the monolayer (this is especially effective with the bolaamphiphiles so they can interdigitize and hold the monolayer together) and their ability to react covalently with the surface (one end) and still have the second head group available for reactions at the outer exposed surface. Without this intermolecular association, the layers would diffuse and form multilayers.

Accordingly, a further object of the present invention is to provide a method of modifying the exposed surface of porous and non-porous organic polymer material comprising providing a multiplicity of bifunctional organic molecules, each bifunctional organic molecule having opposite functional head groups, bonding one head group of the multiplicity of bifunctional organic molecules to the polymer material to form a self-assembled monolayer on the polymer material with opposite head groups of the multiplicity of bifunctional organic molecules forming a new exposed surface, and modifying the new exposed surface by chemical reactions using the chemistry of the head group.

For the purpose of this disclosure, the porous and non-porous organic polymer materials include solid substrates made of the polymer material or solid substrates covered by a porous or non-porous organic polymer film.

A still further object of the present invention is to utilize covalent attachments for bonding the bolaamphiphiles to the polymer material surface.

Another object of the present invention is to use bifunctional molecules which self-assembled so that the method includes bonding only some of the multiplicity of bifunctional molecules to the polymer material surface initially and then exposing the surface to additional bifunctional molecules which interdigitize between the bond molecules, completing and stabilizing the monomolecular layer by intermolecular forces, for example, through hydrogen bonding, $\pi$–$\pi$ and/or hydrophobic interactions.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DESCRIPTION OF THE PREFERRED EMBODIMENTS

Figure 1:
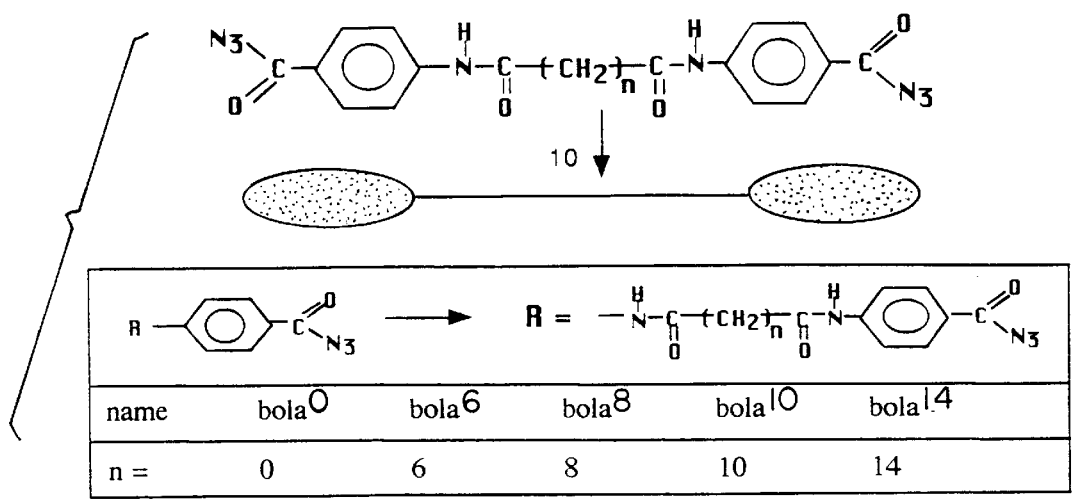
FIG. 1 is a schematic representation showing the chemical formula and corresponding symbol for a preferred embodiment of the bifunctional organic molecule used in accordance with the present invention.
Figure 2:
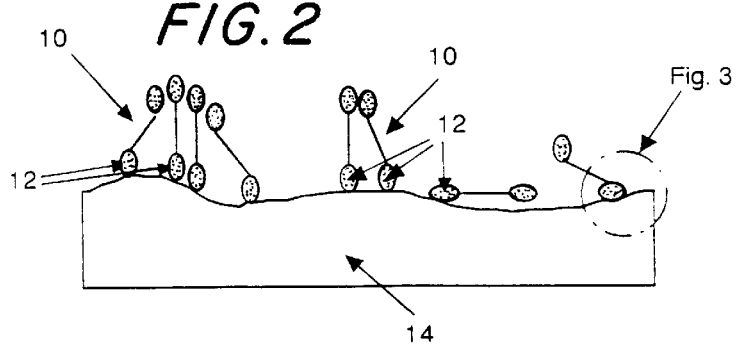
FIG. 2 is a schematic side elevational view of an initial step in the method of the present invention.
Figure 3:
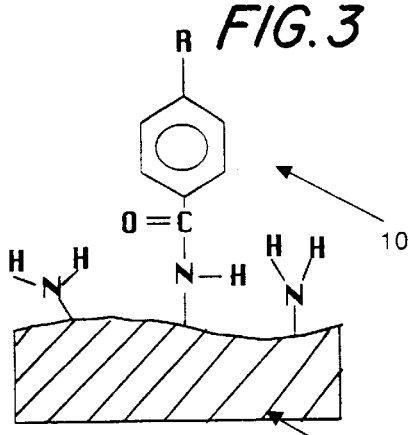
FIG. 3 is an enlarged schematic representation taken from the area labeled 3 in FIG. 2, showing the covalent bonding of one of the bifunctional molecules to a polymer material having amino groups on the surface.

The invention is a new method for modifying the exposed surface of porous and non-porous polymer materials. It uses the phenomenon that certain molecules, such as the newly synthesized bolaamphiphiles line up in 2-D multiple rows (self-assembled monolayers or SAMs) and under specific conditions will react with the surface and sometimes with neighboring molecules such that this ordered layer covers and becomes fixed on the surface. FIG. 1 shows the chemical formula of the bolaamphiphiles and the symbol for the bolaamphiphiles used in the other figures. The valve for "n" may be 0 (zero) to 14. The non-reacted ends of such bifunctional molecules (i.e. the exposed surface) can then be used for further reaction/grafting of desirable functionality. As an example of this process, bolaamphiphiles are used to demonstrate the inventive method. During a first step of self-assembly shown in FIG. 2, one end 12 of the bolaamphiphilic molecules 10 reacts with available surface functionalities (hydroxyl, amine etc.) of the polymer solid or polymer film covered solid both shown as 14. This results in covalent fixation of the molecules to the polymer surface as shown in FIG. 3.

Figure 4:
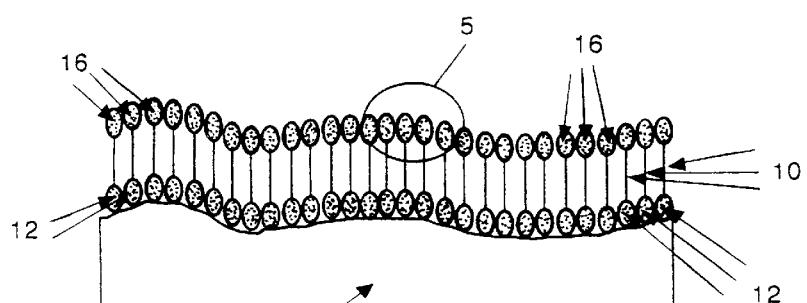
FIG. 4 is a view similar to FIG. 2 showing the assembled SAM layer on the polymer surface.
Figure 5:
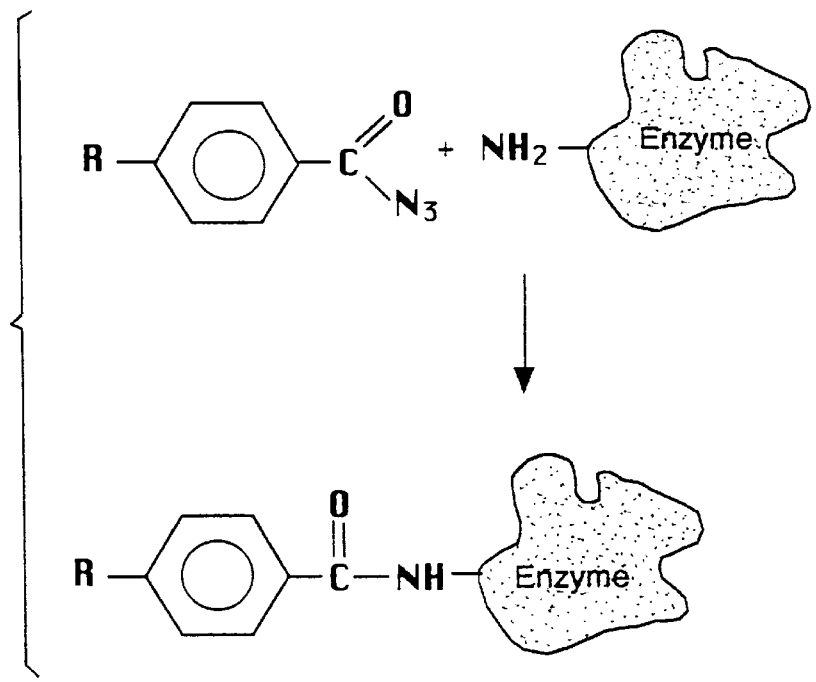
FIG. 5 is a schematic representation in the form of a flow diagram illustrating one example of a reaction that can occur in the area marked 5 in FIG. 4, according to the present invention, illustrating a possible reaction pathway for immobilization reactions on the outer surface of SAM bolaamphiphiles layers.
Figure 6:
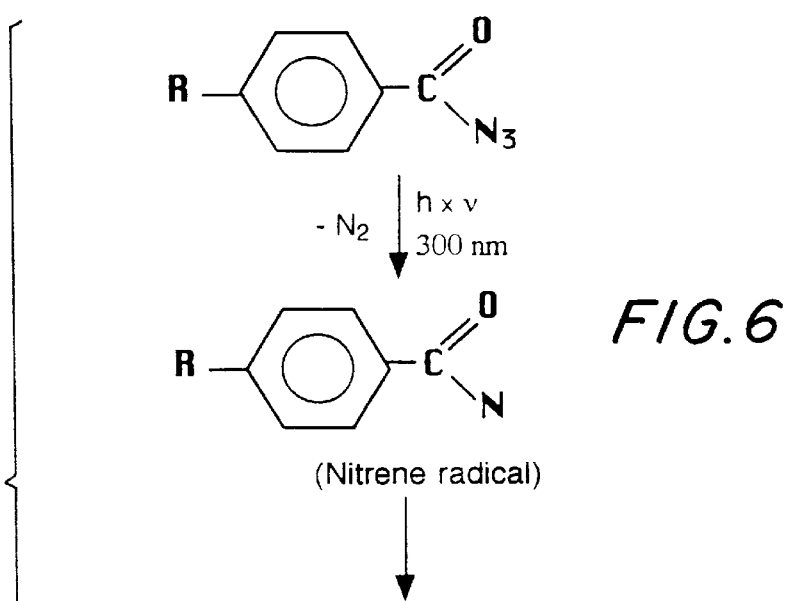
FIG. 6 is a view similar to FIG. 5 of another reaction that can occur in the area marked 5 in FIG. 4, according to the present invention.

The second step (self ordering process) involves a complete closure of the monolayer in FIG. 4. This process occurs because of the special molecular design of the compounds used. The driving force for the formation of the highly ordered, dense, monomolecular layer or SAM is the formation of a network of amide hydrogen bonds supported and stabilized by the hydrophobic interaction between the alkyl chains. As a result of this self assembling procedure, a well-defined new interface is created. The unreacted exposed ends 16 of the amphiphile molecules 10, consisting of benzoic acid azide groups, is most useful for immobilization of a range of active molecules via nucleophilic substitution and/or photochemical entrapment, as shown in FIGS. 5 and 6.

The SAM can completely cover the exposed surface (external and internal pore surface) changing the surface chemistry from the underlying matrix chemistry in surface 14 to that of the exposed surface 16 (benzoic acid azide groups) of the self-assembled monolayers (SAM). The high degree of order of the SAM is able to impart a very well-defined new surface. This is often impossible with other surface modification methods such as heterogeneous wet chemistry, irradiation methods (UV, ion bombardment, etc.) or plasma techniques. These latter techniques usually lack order and often react with the surface randomly, hence their modified surfaces are less well defined than the invention. Non-specific unwanted interactions thus occur with these other techniques. Additionally, there are at least two major advantages for immobilization at the benzonic acid azide end of SAMs using the photochemistry of these head groups: (1) The possibility of spatially resolved immobilization using a mask, and (2) the possibility of stepwise immobilization of two or more different species using a combination of nucleophilic and photochemical immobilization. For photochemical immobilization masking techniques can be used.

Immediate uses of the invention include surface modification of (1) medical devices such as catheters to reduce clotting, (2) synthetic membranes to reduce non-specific adsorption (of proteins for example), (3) chromatographic packing materials to impart specific surface properties, (4) marine surfaces to reduce the build-up (absorption) of marine molecules and biological species, and (5) other surfaces which require a well defined molecular chemistry, (e.g. bound enzymes, gas transport films for packaging or fractionation).

One major advantage of the invention is that the self-organization of the monolayers occurs without help. This is in contrast to Langmuir Blodgett layers (LB) that have proved impractical because the surface and solutions need to be ultraclean and the monolayers require external assistance (pressure) to form.

Monolayers of bolaamphiphiles having the chemical structure shown in FIG. 1, are able to self-assemble on the surface of a wide variety of polymer or polymeric materials.

The present invention can work on all polymeric materials that contain functional groups of the general chemical structure $$R\text{-}X\text{-}H \tag{I}$$

where R represents the polymer and X can be NH (amino group), O (hydroxyl group) or SH (thiol or mercaptan group).

The following four examples demonstrate different procedures to produce SAMs with bolaamphiphiles on different polymeric surfaces.

EXAMPLE 1

Self-assembled Monolayers on the Surface of Poly (allyl amine hydrochloride) Films Poly(allyl amine hydrochloride) (Aldrich) (II) was used to produce self assembled monolayers of the compound 1, 12-Dodecanediacid di(benzoic acid azide) diamine (Bola[10]).

The polymer sample was immersed in a solution of Bola[10] (c=2 mM/L or 1 mg/mL) in chloroform

Figure 7:
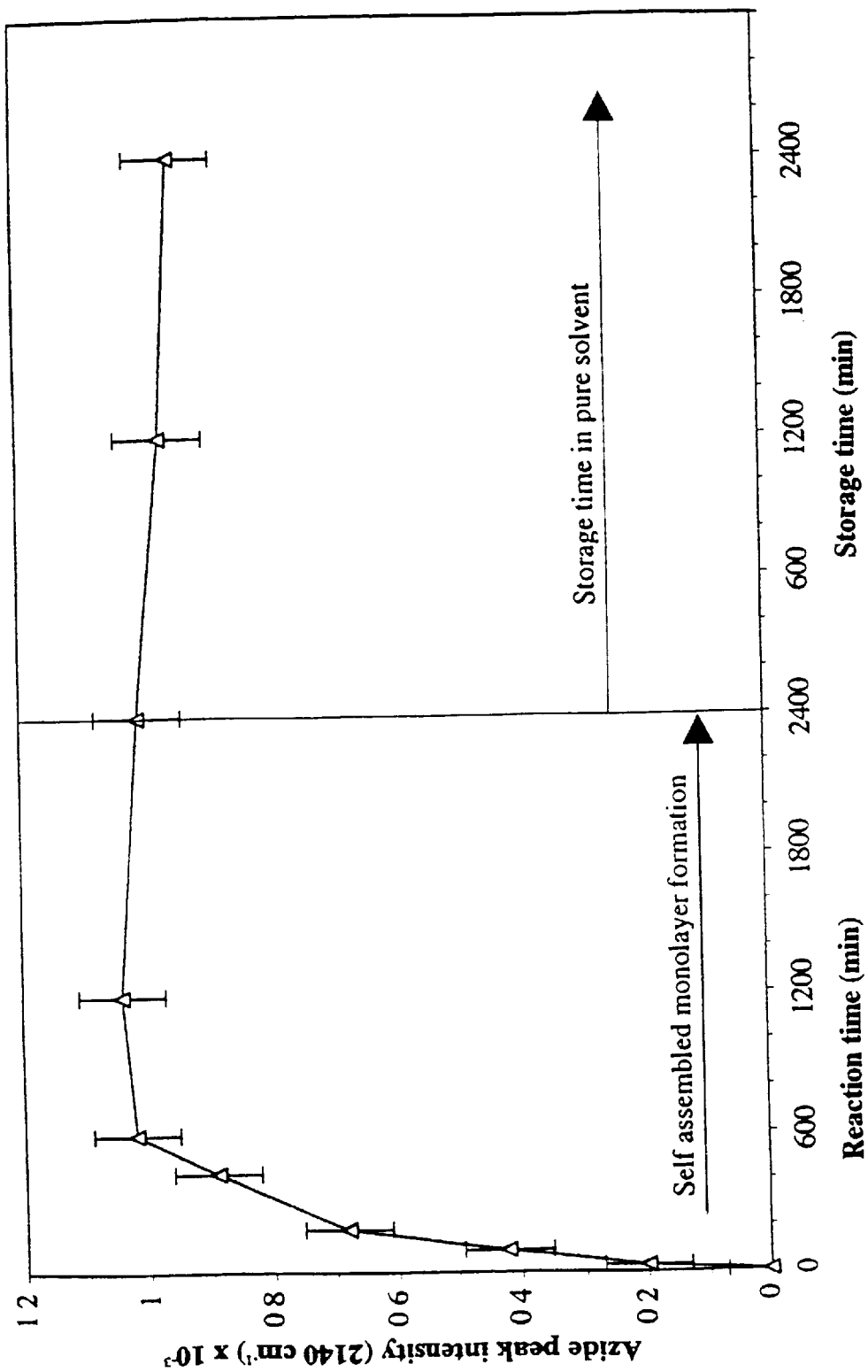
FIG. 7 is a graph plotting azide peak intensity against time, according to one embodiment of the invention, the graph illustrating kinetics of the formation of a bolaamphiphile SAM on poly(allyl amine hydrochloride) film as support and chemical stability during storage in chloroform, the error bars indicating the accuracy of the experiment.

The kinetics of the monolayer formation was investigated using thin spin-coated films of poly(allyl amine hydrochloride). FIG. 7 shows the increase in peak intensity of the azide band in the reflection-absorption FT-IR (RA-IR) spectrum. The azide concentration increased, reaching a constant value at about 600 minutes (10 hours). This indicated the completion of the layer formation. The self-assembled layer was stable in various solvents, e.g. in pure chloroform for 48 hours (as shown in FIG. 7) which confirmed the stable linkages between monolayer and the polymer surface (covalent bonding) and between the bolaamphiphile molecules in the layer (strong intermolecular forces within the monolayer). Also, no significant changes in structure and chemistry were observed after storage of the sample (self-assembled monolayer on the polymer film) in tetrahydrofurane (THF), ethyl acetate, toluene, acetone and acetonitrile for 24 hours (not shown). The outer interface of this self-assembled bolaamphiphile monolayer consisted of benzoic acid azide groups and could be used for immobilization reactions as described in the following Examples 5 and 8.

EXAMPLE 2

Self-assembled Monolayers on the Surface of Poly (vinyl alcohol) Films

Poly(vinyl alcohol) (Aldrich) (III) was used to produce self-assembled monolayers of the compound Bola[10]. The polymer sample was immersed in a solution of Bola[10] (c=2 mM/L or 1 mg/mL) in THF.

Figure 8:
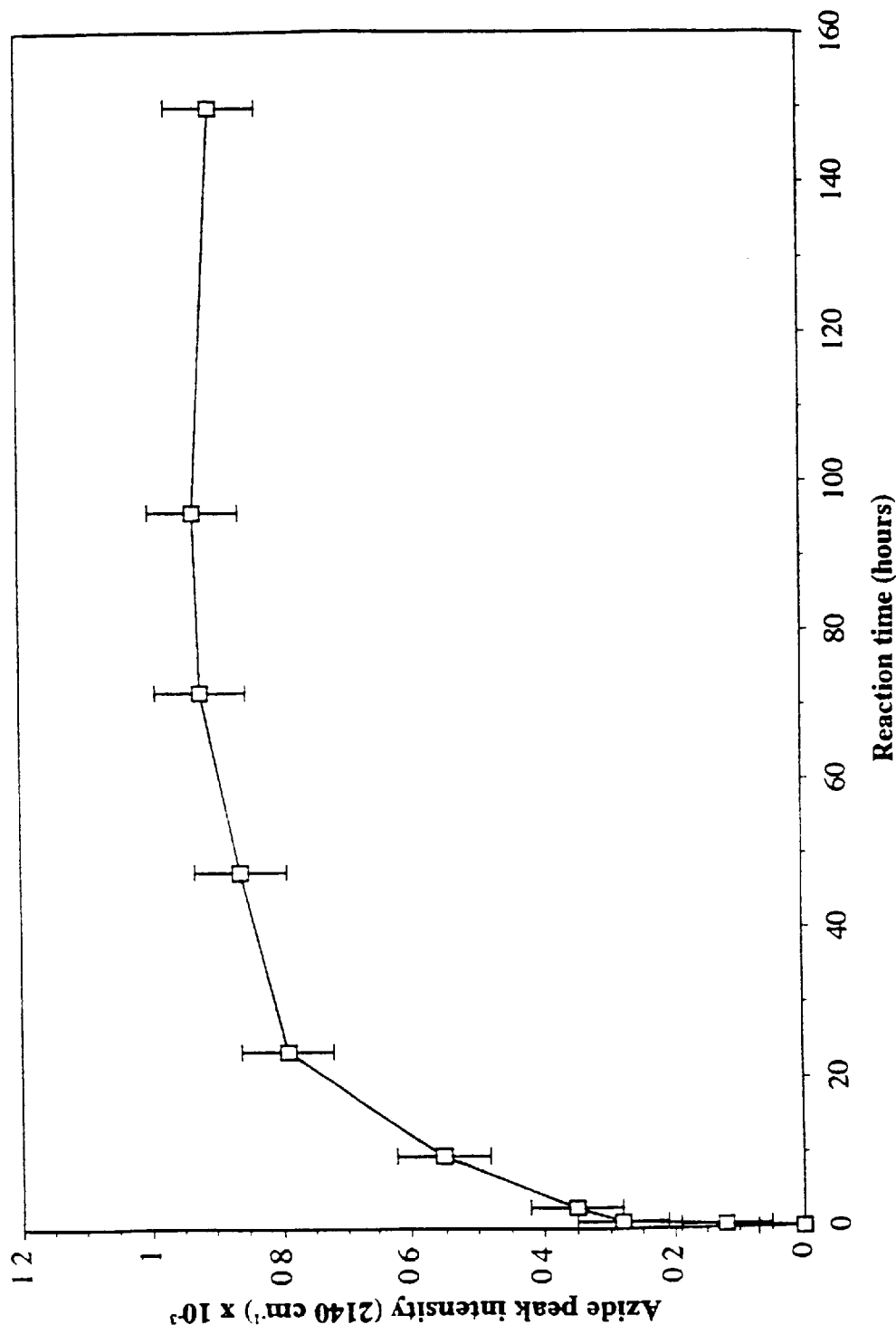
FIG. 8 is a graph similar to FIG. 7 showing another embodiment of the invention, the graph showing kinetics of the formation of a bolaamphiphiles SAM on poly(vinyl alcohol) film as support.
Figure 9:
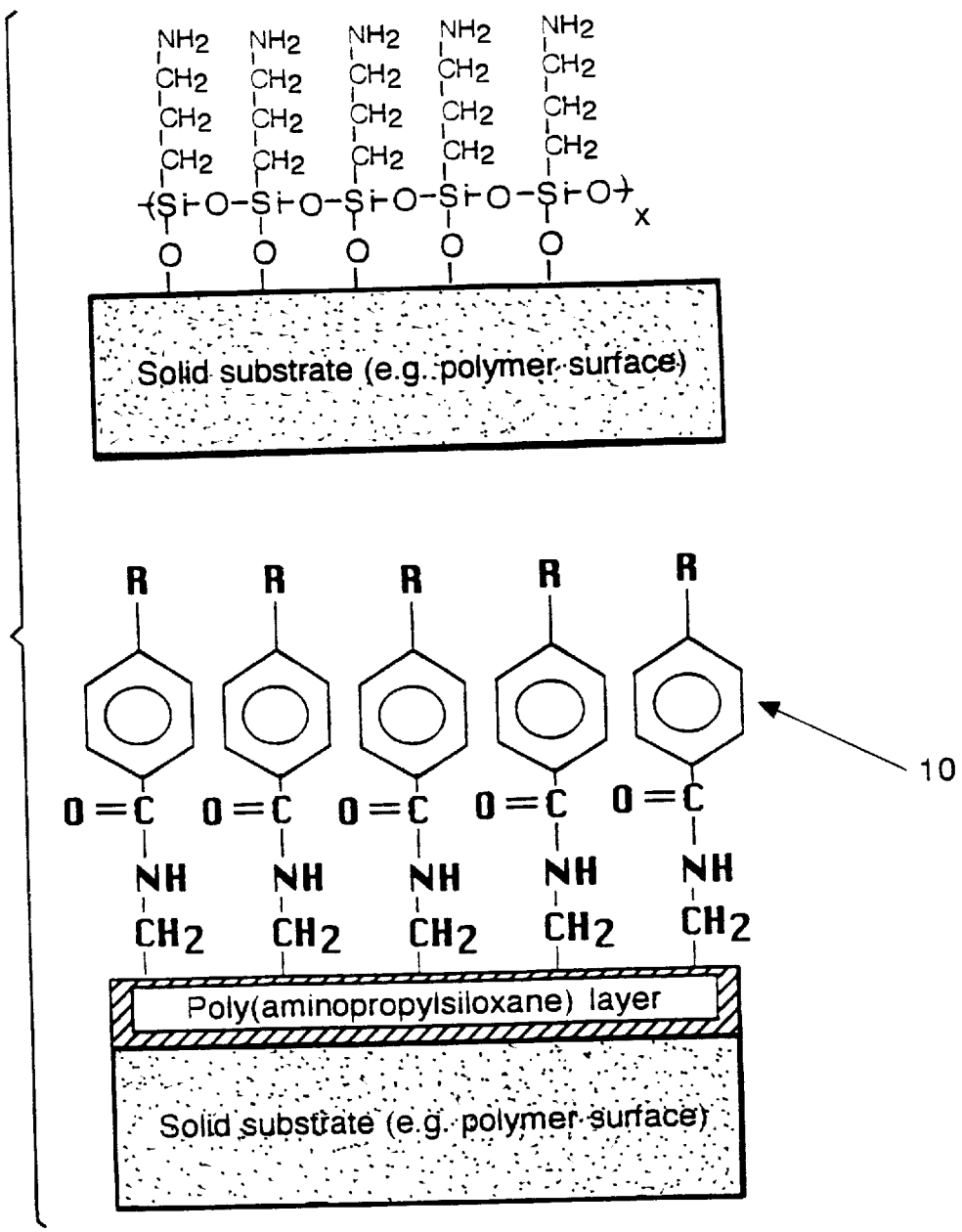
FIG. 9 is a schematic representation of a self-assembled monolayer according to another embodiment of the invention, showing schematically the structure of poly (aminopropylsiloxane) on a polymer surface with bolaamphiphiles attached covalently to the surface.

Again, the kinetics of monolayer formation was investigated using thin spin-coated films of poly(vinyl alcohol). FIG. 8 shows the increase in peak intensity of the azide band in the RA-IR spectra. The azide concentration increased until it reached a constant value at about 40 hours. The peak intensity was comparable to that obtained for self-assembled monolayers on poly(allyl amine hydrochloride) indicating that a similar formation procedure occurred. However, the reaction time was about four times longer for this case. Faster reaction times could be obtained using basic catalysts like triethyl amine or N,N-dimethyl amino pyridine.

The invention also operates on organic polymer materials chemically treated to produce specific surface functional groups.

These are polymeric materials which have functional groups as listed above at (I) on the surface, as a result of a chemical or physical pretreatment of the sample. Examples follow:

EXAMPLE 3

Self-assembled Monolayers on the Surface of Thin poly(aminopropylsiloxane) (PAPS) Film Self assembled monolayers of the compound Bola[10] were produced after formation of a thin PAPS layer on the top of a spin-coated film made of different polymer materials (e.g. poly(vinyl acetate), poly(acrylonitrile), cellulose acetate and poly(vinylidene fluoride)). The PAPS layer was produced according to a well-known procedure by immersing the polymer sample in a 1 vol % solution of 3-aminopropyltriethoxysilane (Sigma) in methanol for 10 minutes, and washing the sample three times with methanol [see Kurth, D. G.; Bein, T.: Langmuir 11 (1995) 578; and Bekos, E. J.; Ranieri, J. P.; Aebischer, P.; Gardella Jr., J. A.; Bright, F. V.: Langmuir 11 (1995) 984; and Sekkat, Z.; Wood, J.; Geerts, Y.; Knoll, W.: Langmuir 11 (1995) 2856]. The resultant multilayer PAPS film is known to have exposed free amino groups at the interface. A monolayer could then be self-assembled on this PAPS film using the same protocol as described in Example 1. A specific advantage of this method is the stability of the bolaamphiphile layer in water. This allows for the immobilization of water soluble species, e.g. biomolecules like enzymes or antibodies (see also Example 7) onto the exposed surface of the self-assembled layers.

EXAMPLE 4

Self-assembled Monolayers on Plasma Treated Polymer Surfaces

Self assembled monolayers of the compound Bola[10] were produced on the surface of a plasma treated polymer film. The use of plasma-induced surface modification using an ammonia atmosphere allows the introduction of primary and secondary amino groups to a broad range of polymer materials used for the fabrication of separation membranes (e.g. poly(ethylene), poly(propylene), poly(sulfone), poly (vinylidene fluoride), Teflon (a trademark for a PTFE), poly(acrylonitrile), cellulose acetate) and is described in the literature. [see Gengenbach, T. R.; Xie, X.; Chatelier, R. C.; Griessner, H. J.: J. Adhesion Sci. Techmol. 8 (1994) 305]. A spin-coated film made of poly(ethylene) was plasma-modified in vacuum (0.23–0.25 Torr), 50 W, for 15 minutes, then exposed to a $NH_3$ atmospher for 10 minutes and then washed twice with THF and then immersed in a solution of A10 (c=2 mM/L or 1 mg/mL) in THF. Again, the formation of the self-assembled monolayer was detected using RA-IR spectroscopy. A specific advantage of this method was the formation of a chemically uniform surface on the polymer by the bolaamphiphile monolayer. The chemical structure of polymer surfaces after plasma modification procedures is often very inhomogeneous and consists of a mixture of functional groups. However, the post-treatment of the plasma-modified surface with bolaamphiphiles generated a chemically well-defined surface, ideal for further modification or immobilization reactions.

The following are examples for Surface Immobilization Reactions.

Self-assembled monolayers of bolaamphiphiles claimed in this application are able to react with a broad range of chemical compounds using the nucleophilic substitution reaction and photochemically entrapment reaction, respectively. Each reaction is discussed below.

Immobilization by Nucleophilic Substitution Reactions:

All species containing the functional groups of the general chemical structure

where R represents a molecule and X can be NH (amino group), O (hydroxyl group) or S (thiol group) are able to react with the outer benzoic acid azide group of the self assembled bolaamphiphile monolayer by a simple nucleophilic substitution reaction (see FIG. 5).

EXAMPLE 5

Immobilization of 1-amino ethanol

The polymer self-assembled bolaamphiphile sample (called "polymer-SAM-sample" below) was immersed in a solution of 1-amino ethanol (c=0.75 mol/L or 0.5 vol %) in THF at room temperature. The reaction was complete after about 10 minutes. The rate of the surface reaction was measured using reflection-absorption FT-IR (RA-IR) spectroscopy. The resulting new surface was hydrophilic with a water contact angle of about 30 degrees. The contact angle for the unreacted benzoic acid azide surface was about 75 degrees.

By selecting different reacting molecules, new chemically defined interfaces consisting of pre-chosen exposed functional groups or mixtures of different functional groups can be prepared by simple immersing the polymer-SAM-sample in a solution containing the reactant molecules. Also, a broad range of aqueous and organic solvents and mixtures can be used.

EXAMPLE 6

Immobilization of dansyl cadaverine

Dansyl cadaverine is a fluorescent dye with a free amino group at the end of a alkyl spacer group. A monolayer of this compound was assembled on a polymer-SAM-sample using a solution of dansyl cadaverine (Fluka) (c=0.167 mol/L or 5.6 mg/mL) and triethyl amine (c=0.07 mol/L or 1 vol %) in THF at room temperature. Typical reaction times were in the range of 10 hours. Afterwards, the sample was washed extensively with pure THF. Investigations of the sample using fluorescence microscopy show a homogenous and complete coverage of the surface by immobilized fluorescence molecules.

EXAMPLE 7

Immobilization of Protein A

Many proteins (i.e. enzymes, antibodies) contain exposed L-lysine ($-NH_3$) or L-cysteine (-SH) residues on a poly amino acid chain. For example, the immobilization of L-lysine on self-assembled bolaamphiphile monolayers is possible because of the reactive ω standing free amino group in the molecule. To demonstrate that self-assembled monolayers can bind such proteins, a commercially available fluorescence labeled protein A was immobilized on the surface of a bolaamphiphile monolayer. Protein A is a single polypeptide chain containing 301 amino acids and when folded in its natural state has affinity for the FC-region of immunoglobulins. Typically, a solution of 200 mg protein A (ICN Chemicals) in a mixture of 5 mL methanol and 5 ML water containing a 0.05 mol/L borax buffer with a pH=8.0 was used for immobilization at 25° C. The immobilization was complete after 24 hours immersion of the polymer sample. After extensive washing, the bound protein was detected by fluorescence microscopy as well as by RA-IR spectroscopy. FIG. 5 schematically illustrates the process.
Photochemical immobilization Immobilization of a broad range of molecules and macromolecules on the outer surface of self-assembled bolaamphiphile monolayers using the benzoic acid azide photochemistry is also possible (FIG. 6). UV irradiation ($\lambda$=300 nm) generates highly reactive radicals (nitrenes). Very fast radical-reactions with surrounding molecules occur leading to covalent linkages between the molecules in the monolayer and these added species. Most efficient are insertion reactions in hetero atom-hydrogen bonds like amino or hydroxyl groups. However, insertion also occurs with aliphatic and aromatic carbon-hydrogen bonds. One example is given below.

EXAMPLE 8

Photochemically Immobilization of Fluorescence Isothiocyanate (FITC)

A solution of FITC (Aldrich) in THF (c=0.02 mmol/L or 0.0078 mg/mL) was prepared and 1 mL of this solution was applied to the surface of a polymer-SAM-sample (size about 2×3 cm). After evaporation of the solvent one half of the surface was covered with aluminum foil. Then, the sample was irradiated for five minutes using a high pressure mercury lamp (100 W). See FIG. 6. Special precautions, such as the use of an inert gas atmosphere or light filters, were unnecessary. After irradiation, azide was not detected on the uncovered part of the sample, whereas the azide concentration on the covered part remained unchanged (as detected by RA-IR spectra). The sample was washed several times with THF, methanol and chloroform to extract all of the non-covalently coupled FITC molecules. Afterwards, fluorescence was only measured for the irradiated part of the polymer surface using fluorescence microscopy.

While specific embodiments of the invention have been shown and described in detail to illustrate the application of the principles of the invention, it will be understood that the invention may be embodied otherwise without departing from such principles.

What is claimed is:

1. A method of modifying the exposed surface of porous and non-porous organic polymer material by using self-assembled monolayers, comprising:

providing a multiplicity of bifunctional organic molecules, each bifunctional organic molecule comprise a bolaamphiphile having opposite functional head groups and a chain between the head groups which each have mutual cooperative attraction selected from the group consisting of hydrogen bonding, π—π interaction and hydrophobic interaction with each other;

self-assembling a monolayer by bonding one head group of the multiplicity of bifunctional organic molecules to the polymer material to form a self-assembled monolayer on the polymer material with opposite head groups of the multiplicity of bifunctional organic molecules forming a new exposed surface and self-assembly into the monolayer being effected by the mutual cooperative attraction between the chains of the bolaamphiphiles; and modifying the new exposed surface by chemical reaction of the outer head groups of the multiplicity of bifunctional organic molecules in the monolayer.

2. A method according to claim 1, including bonding one head group of the molecules to the polymer material surface using covalent bonds.

3. A method according to claim 4, including at least some mono-functional molecules having a first functional head group and a second opposite non-functional head group, the mono-functional molecules each having a chain between the first and second head groups, the chains having mutual cooperative attraction selected from the group consisting of hydrogen bonding, π—π interaction and hydrophobic interaction with each other, the method including bonding the functional head group to the polymer material surface as part of the monolayer.

4. A method according to claim 1, including bonding the head groups of some of the bifunctional organic molecules to the polymer material surface, a remainder of the monolayer being formed by interdigitizing the bifunctional organic molecules which have not yet been bonded to the polymer material surface, between the molecules that have been bonded for assembling the monolayer using the mutual cooperative attraction.

5. A method according to claim 1, wherein the head groups of at least some of the bifunctional organic molecules contain a benzoic acid azide group for immobilization of molecules.

6. A method according to claim 5, wherein the bifunctional molecules are bolaamphiphiles, the immobilization creating a selected surface property.

7. A method according to claim 5, wherein the bifunctional molecules are bolaamphiphiles, the immobilization comprising an addition reaction for producing one of a biocatalytically active or affinity surface.

8. A method according to claim 5, wherein the bifunctional organic molecules have the structure:

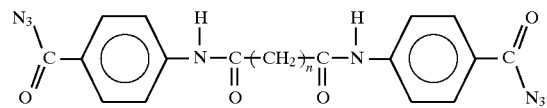

where n is from 0 to 14.

* * * * *